United States Patent
Kawakami

(10) Patent No.: US 9,056,648 B2
(45) Date of Patent: Jun. 16, 2015

(54) BICYCLE COMPONENT POSITIONING DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 1924 days.

(21) Appl. No.: 12/144,719

(22) Filed: Jun. 24, 2008

(65) Prior Publication Data

US 2009/0314117 A1    Dec. 24, 2009

(51) Int. Cl.
*B62K 23/06* (2006.01)
*B62M 25/04* (2006.01)

(52) U.S. Cl.
CPC ........... *B62K 23/06* (2013.01); *Y10T 74/20287* (2015.01); *B62M 25/04* (2013.01)

(58) Field of Classification Search
USPC ................ 74/488, 489, 502.2, 501.6, 473.14, 74/473.15, 575–577
IPC .......................................................... F16C 1/10
See application file for complete search history.

(56) References Cited

U.S. PATENT DOCUMENTS

| | | | |
|---|---|---|---|
| 5,325,735 A | | 7/1994 | Nagano |
| 5,481,934 A | * | 1/1996 | Tagawa ........................ 74/502.2 |
| 5,862,709 A | | 1/1999 | Kageyama |
| 6,767,024 B1 | | 7/2004 | Kuo |
| 2004/0237697 A1 | * | 12/2004 | Kawakami ................... 74/501.6 |
| 2006/0096404 A1 | | 5/2006 | Wessel et al. |

FOREIGN PATENT DOCUMENTS

EP    0 371 429 A2    6/1990

* cited by examiner

*Primary Examiner* — Daniel Yabut
(74) *Attorney, Agent, or Firm* — Global IP Counselors

(57) ABSTRACT

A bicycle component positioning device is provided with a support member, a positioning element, a position maintaining member, a winding element, a release member and a spring member. The winding element is movably between a winding position and a disengaging position. The release member is movably between a neutral position and a position releasing position. The spring member is arranged with respect to the support member to move the winding element from the winding position to the disengaging position in response to movement of the release member from the neutral position to the position releasing position and to return the release member to the neutral position after movement of the release member from the neutral position to the position releasing position. The spring member applies a biasing force to the release member without the biasing force being transmitted through the position maintaining member.

11 Claims, 8 Drawing Sheets

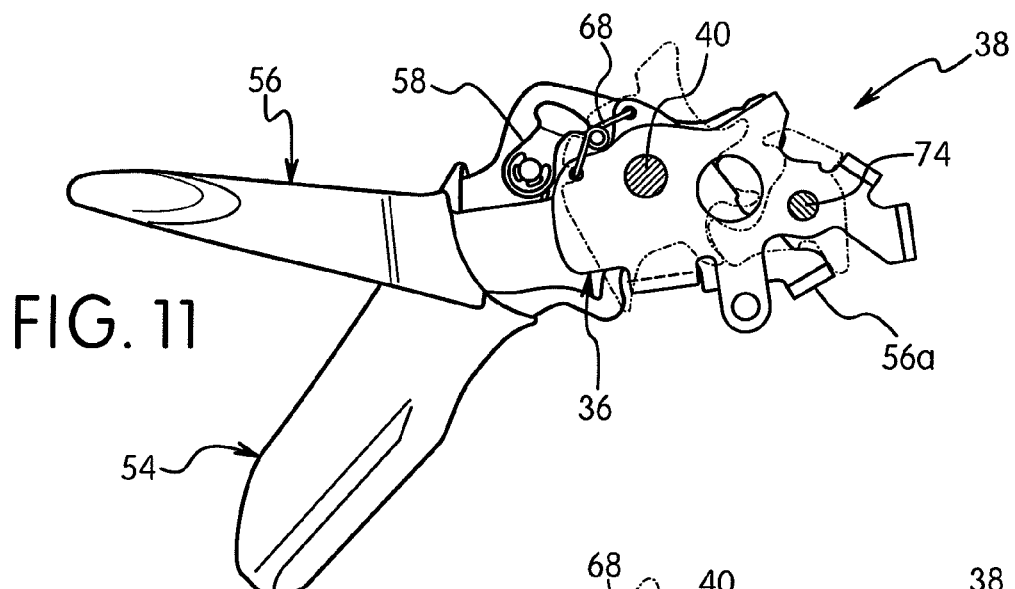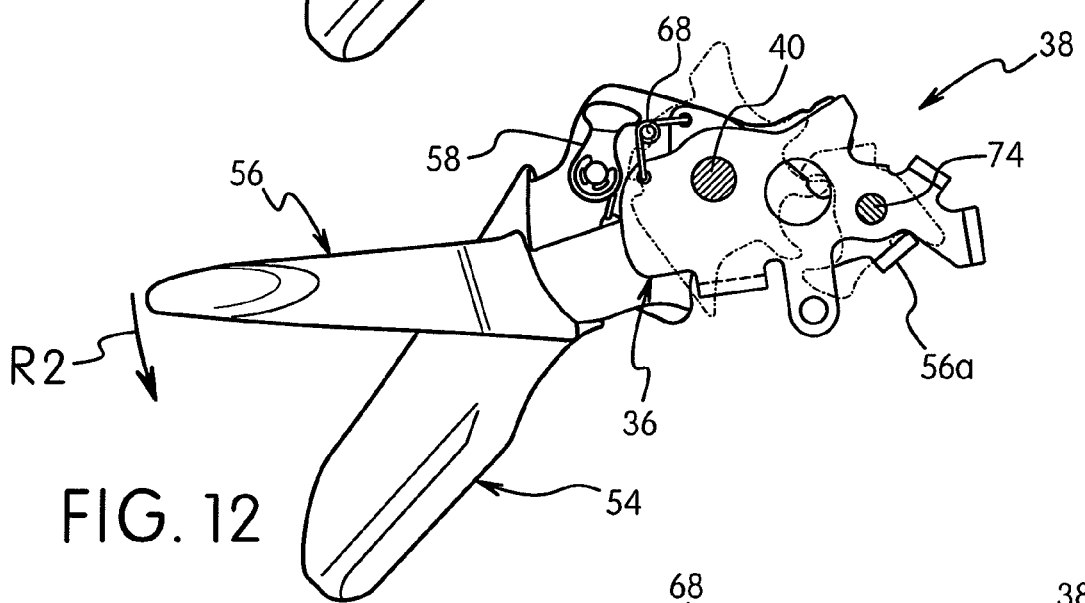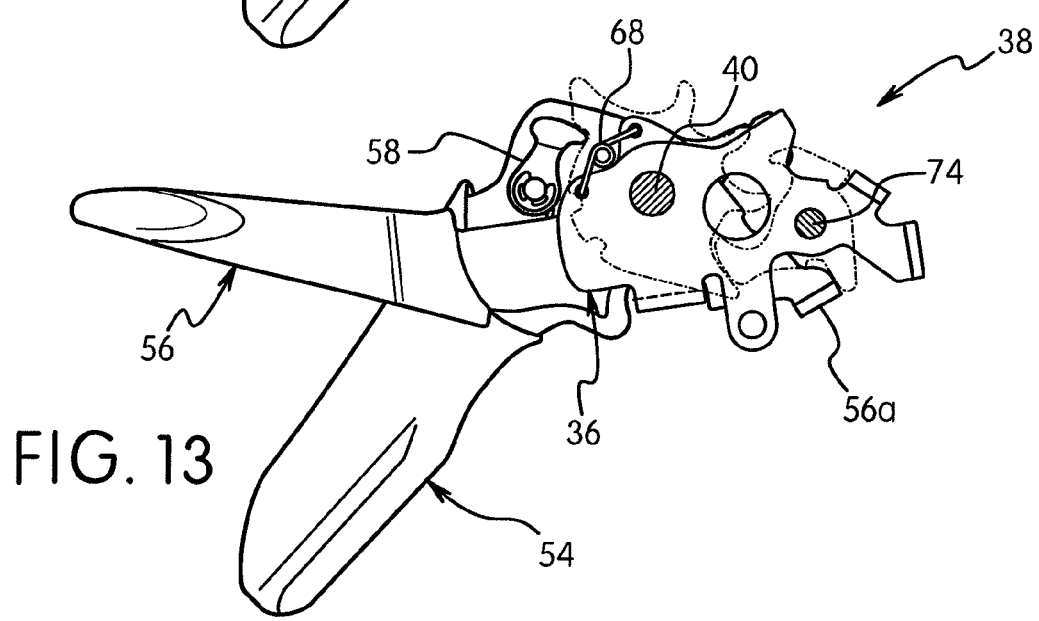

BICYCLE COMPONENT POSITIONING DEVICE

BACKGROUND OF THE INVENTION

1. Field of the Invention

This invention generally relates to a bicycle component positioning device for a bicycle operating device such as a bicycle shifter.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the bicycle transmission.

Typically, a bicycle transmission includes a chain driven drive train with a chain extending between a plurality of front sprockets and a plurality of rear sprockets. The plurality of front sprockets also typically includes a front derailleur and a rear derailleur for shifting the chain between the front and rear sprockets, respectively. Front and rear shift operating devices or shifters are provided for operating the front and rear derailleurs to move the chain laterally between adjacent sprockets of the drive train. The front sprockets are usually coupled to the front crank, while the rear sprockets are usually coupled to the rear wheel such that a pedaling force from the rider is transferred to the rear wheel via the chain.

Currently, there are many types of cable operated shifting devices currently being installed on bicycles. For example, some cable operated shifting devices have one or more levers and a cable winding (takeup) member that rotates via a ratchet mechanism to wind and release an inner wire of an operating cable. The inner wires of the operating cables are coupled between one of the front and rear derailleurs and one of the front and rear shift operating devices to shift the chain over the various sprockets. With conventional cable operated shifting devices of this type, operation of one of the shift lever causes the cable winding member to rotate via the ratchet mechanism in one direction. As a result, the cable is wound around the cable winding member, and a shift is made by the shift mechanism from one gear to the next gear. Operation of the other shift lever causes the ratchet mechanism to be released and the cable winding member to rotate in the other direction. As a result, the cable that was wound on the cable winding member is played out, and a shift is made in the opposite direction by the shift mechanism. While these prior shift operating devices work well, they can often be complicated and expensive to manufacture and assemble. Furthermore, these prior shifting devices are sometimes heavy and/or cumbersome.

In view of the above, it will be apparent to those skilled in the art from this disclosure that there exists a need for an improved position control mechanism for a bicycle operating device such as a bicycle shifter. This invention addresses this need in the art as well as other needs, which will become apparent to those skilled in the art from this disclosure.

SUMMARY OF THE INVENTION

One object of the present invention is to provide a bicycle component positioning device with a spring member in which movement of a release lever causes the spring member to move a winding element to a disengaged position and to return the release member to a neutral position after movement of the release member from the neutral position to a position releasing position.

The foregoing objects can basically be attained by providing a bicycle component positioning device that basically comprises a support member, a positioning element, a position maintaining member, a winding element, a release member and a spring member. The positioning element is rotatably coupled to the support member to rotate about a main axis between a plurality of predetermined shift positions. The position maintaining member is movably arranged with respect to the support member to move between a holding position that holds the positioning element in one of the predetermined shift positions and a position releasing position that releases the positioning element for rotational movement. The winding element is movably arranged with respect to the support member to move between a winding position and a disengaging position. The release member is pivotally arranged with respect to the support member to move the position maintaining member between the holding position and the position releasing position in response to pivotal movement of the release member between a neutral position and a position releasing position. The spring member is arranged with respect to the support member to move the winding element from the winding position to the disengaging position in response to movement of the release member from the neutral position to the position releasing position and to return the release member to the neutral position after movement of the release member from the neutral position to the position releasing position. The spring member applies a biasing force to the release member without the biasing force being transmitted through the position maintaining member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is an enlarged top plan view of selected parts of the gear shifter component shown in a neutral or rest position;

FIG. 12 is an enlarged top plan view, similar to FIG. 11, of selected parts of the gear shifter component illustrating the release lever in the position releasing position during a shifting operation in the second or release direction; and FIG. 13 is an enlarged top plan view, similar to FIGS. 11 and 12, of selected parts of the gear shifter component illustrating the release lever in the neutral or rest position after the shifting operation of FIG. 12.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
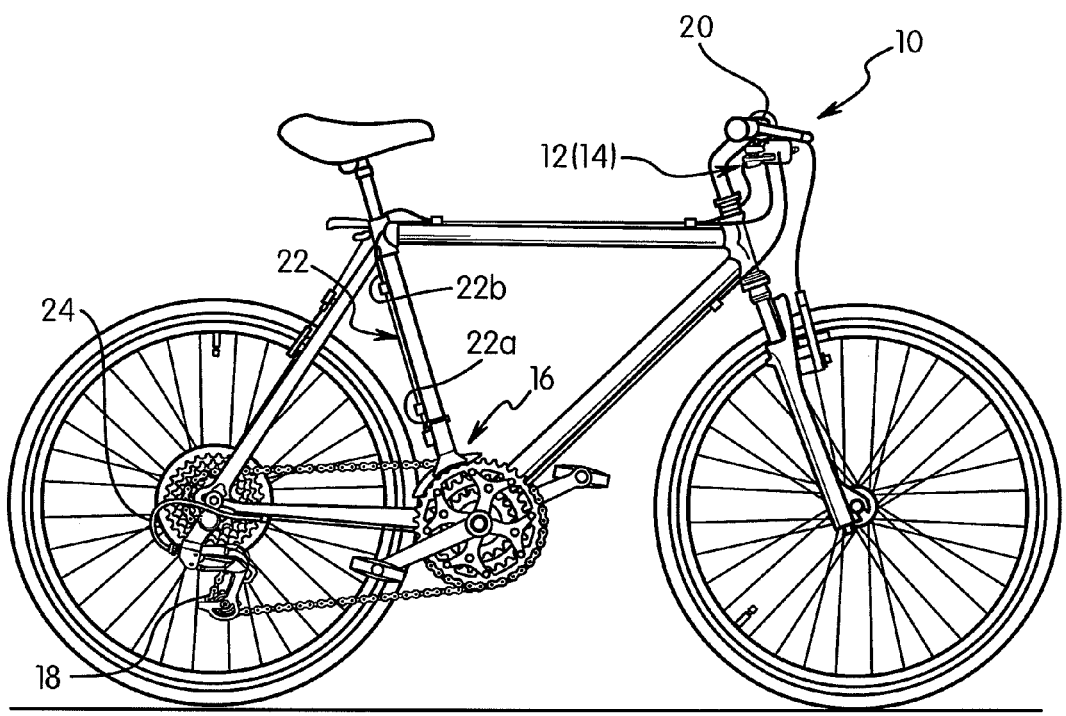
FIG. 1 is a side elevational view of a bicycle equipped with a bicycle control or operating device in accordance with one embodiment.
Figure 2:
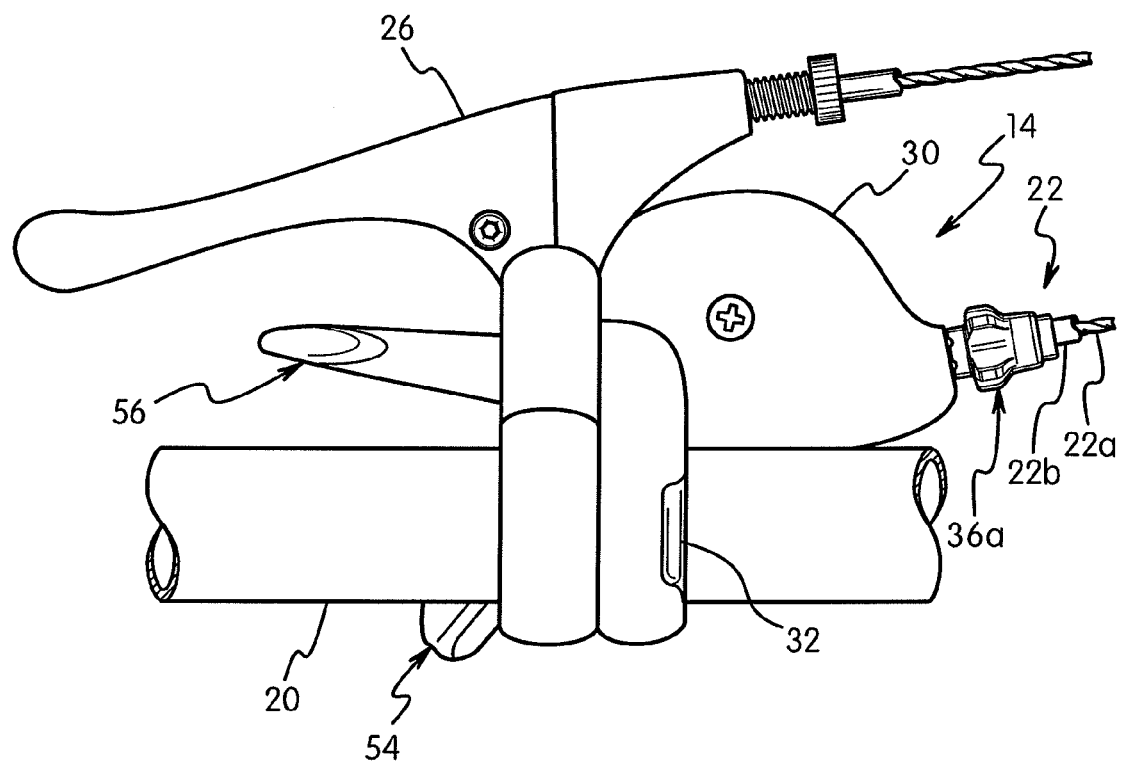
FIG. 2 is a top plan view of the bicycle control or operating device in accordance with the illustrated embodiment.

Referring initially to FIGS. 1 and 2, a bicycle 10 is illustrated equipped with a pair of bicycle shift operating (control) devices 12 and 14 in accordance with one embodiment. In the illustrated embodiment, the bicycle 10 is equipped with a various conventional components, including a front derailleur 16 and a rear derailleur 18, which are examples of parts of a bicycle drive train. The bicycle shift operating devices 12 and 14 are mounted on a handlebar 20. The bicycle shift operating device 12 is a right hand side control device operated by the rider's right hand, while the bicycle shift operating device 14 is a left hand side control device operated by the rider's left hand. Alternatively, the bicycle shift operating devices 12 and 14 can be switched so that the rider can operate the front and rear derailleurs 16 and 18 with opposite hands as needed and/or desired.

In the illustrated embodiment, the right and left hand bicycle shift operating devices 12 and 14 are essentially identical in operation, except that they are mirror images of each other and the number of shift positions are different. In other words, the left hand side shift operating device 14 is substantially identical to the right hand side shift operating device 12, except for the shifting unit of the left hand side shift operating device 14 has been modified to be a mirror image and to decrease the number of gears that can be shifted with respect to the right hand side bicycle shift operating device 12. Thus, only the left hand side bicycle shift operating device 14 will be discussed and illustrated herein.

A shift operating cable 22 operatively connects the bicycle shift operating device 14 to the front derailleur 16, while a shift operating cable 24 connects the shift operating device 12 to the rear derailleur 18. The rear derailleur 18 can be moved between a plurality of different gear positions by the bicycle shift operating device 12 selectively pulling or releasing the shift operating cable 24. Preferably, the front derailleur 16 has three shift positions. Likewise, the front derailleur 16 can be moved between a plurality (at least two) of different gear positions by the bicycle shift operating device 14 selectively pulling or releasing the shift operating cable 22.

Figure 3:
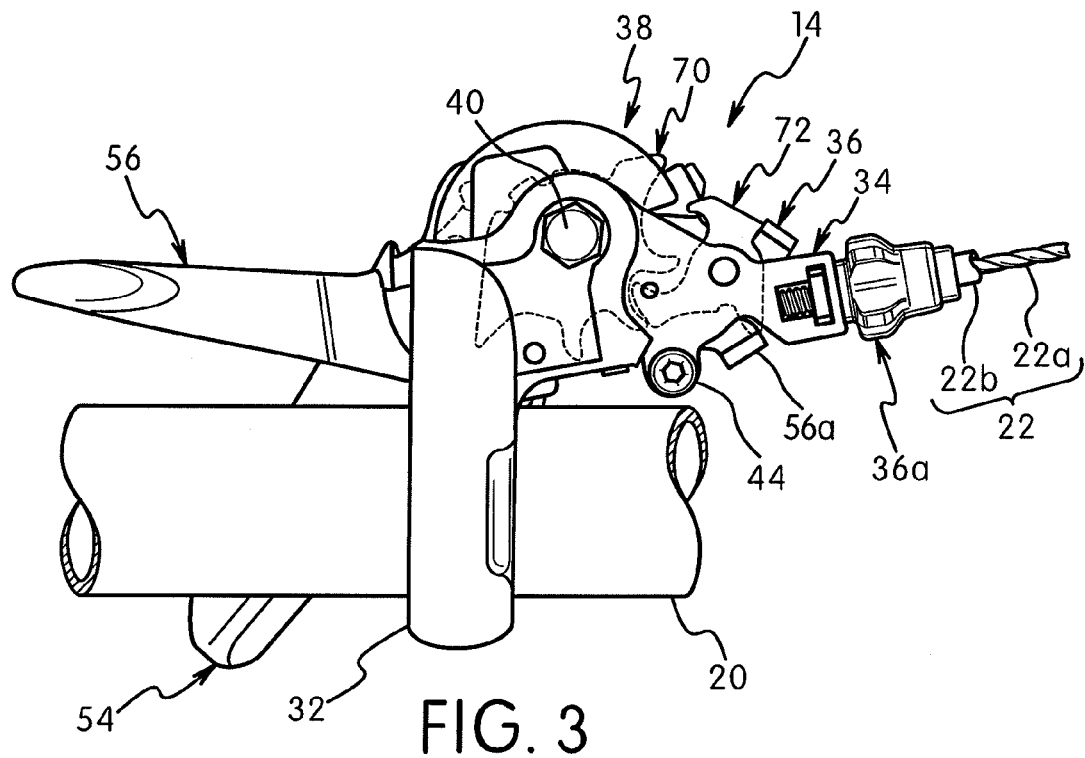
FIG. 3 is a top plan view of the bicycle control or operating device illustrated in FIG. 2 with the housing removed.
Figure 4:
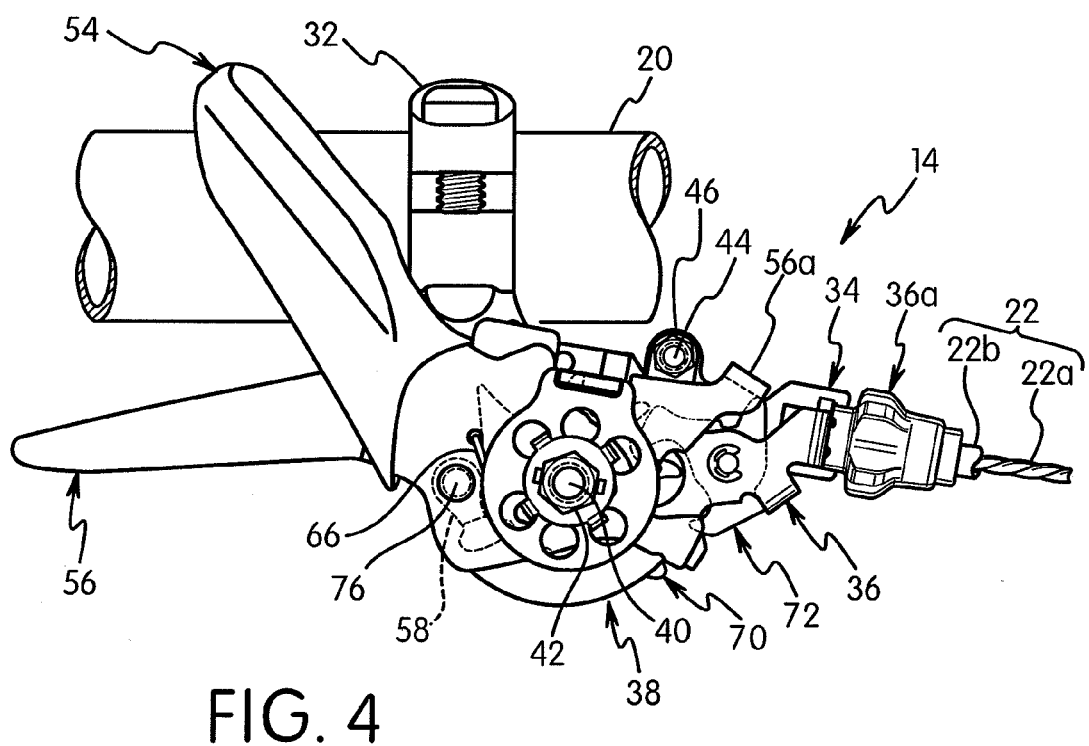
FIG. 4 is a bottom plan view of the bicycle control or operating device illustrated in FIGS. 2 and 3 with the housing removed.
Figure 5:
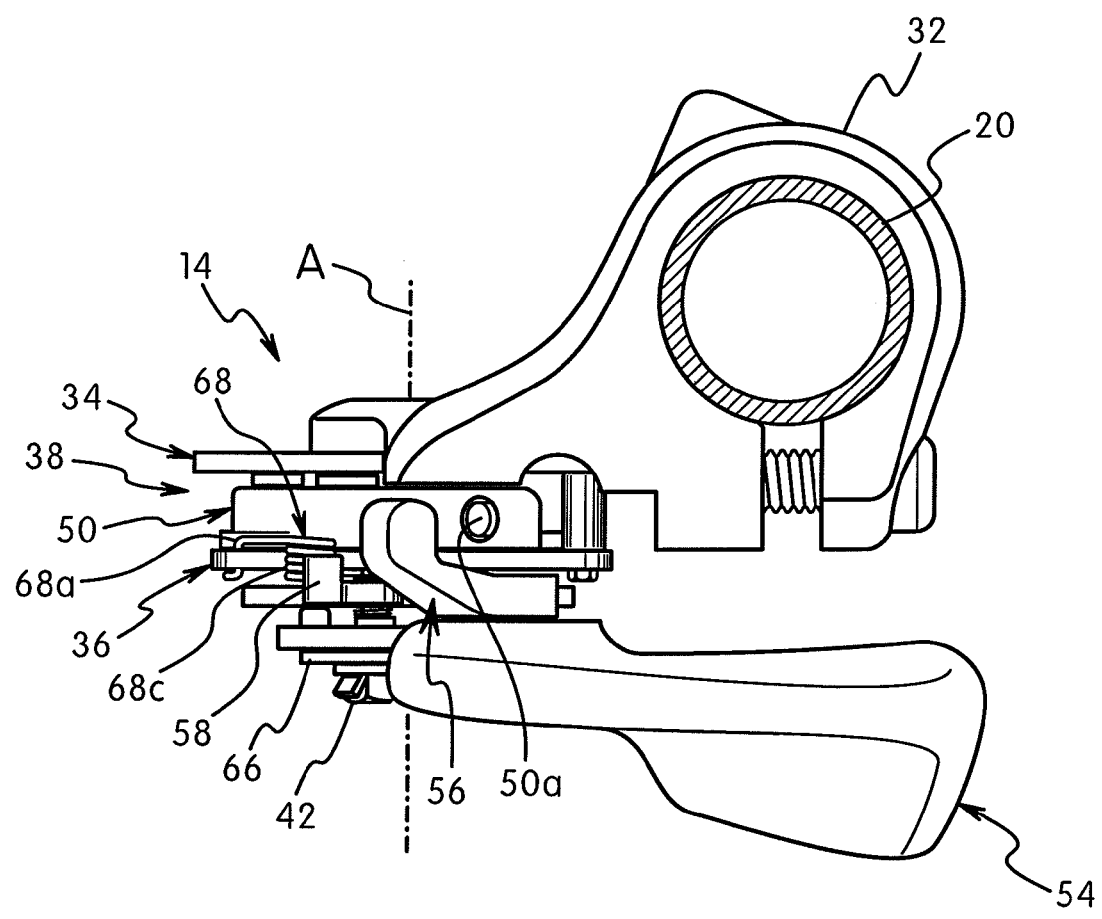
FIG. 5 is an outside elevational view of the bicycle control or operating device illustrated in FIGS. 2 to 4 with the housing removed.

Preferably, the operating cables 22 and 24 are conventional bicycle control cables that have an outer casing the covers an inner wire. In other words, each of the operating cables 22 and 24 basically includes an inner wire slidably received within an outer casing. For example, as seen in FIGS. 2 to 4, the operating cable 22 has an inner wire 22a with an outer casing 22b covering the inner wire 22a.

As seen in FIG. 2, the bicycle shift operating device 14 is mounted on the handlebar 20 closely adjacent to a brake lever 26 on the inward side of the brake lever 26. Preferably, the bicycle shift operating device 14 has a housing 30 for covering the internal parts and a handlebar clamp or bracket 32 for securing the bicycle shift operating device 14 to the handlebar 20. The handlebar clamp 32 is preferably made of, for example, metal and configured to be fastened to the handlebar 20 by tightening a bolt. The housing 30 of the bicycle shift operating device 14 houses the internal parts of the bicycle shift operating device 14, which are discussed below.

As shown in FIGS. 3 to 6, the bicycle shift operating device 14 basically includes an upper support plate 34, a lower support plate 36, a shift control unit 38 and a main support shaft 40. The shift control unit 38 is configured to be operatively connected to the front derailleur 16 by the front shift operating cable 22. The main support shaft 40 extends through the support plates 34 and 36 and the shift control unit 38. Preferably, the main support shaft 40 extends perpendicular to the support plates 34 and 36 and defines a central or main pivot axis A of the shift control unit 38. The main support shaft 40 is preferably a bolt with a nut 42 threaded on its lower end. Thus, the support plates 34 and 36 are coupled together by the main support shaft 40.

The support plates 34 and 36 are preferably rigid metal plates that constitute support members. In addition to being secured together by the main support shaft 40, the support plates 34 and 36 are also secured together by a bolt 44 and a nut 46. The shaft of the bolt 44 is provided with a spacer 48 for holding the support plates 34 and 36 apart at the appropriate spacing. The lower support plate 36 is preferably provided with a cable adjusting nut 36a for receiving the front shift operating cable 22. The cable adjusting nut 36a guides the inner wire 22a of the front shift operating cable 22 to the shift control unit 38. The cable adjusting nut 36a is a conventional structure, and thus, it will not be discussed and/or illustrated in detail.

Figure 6:
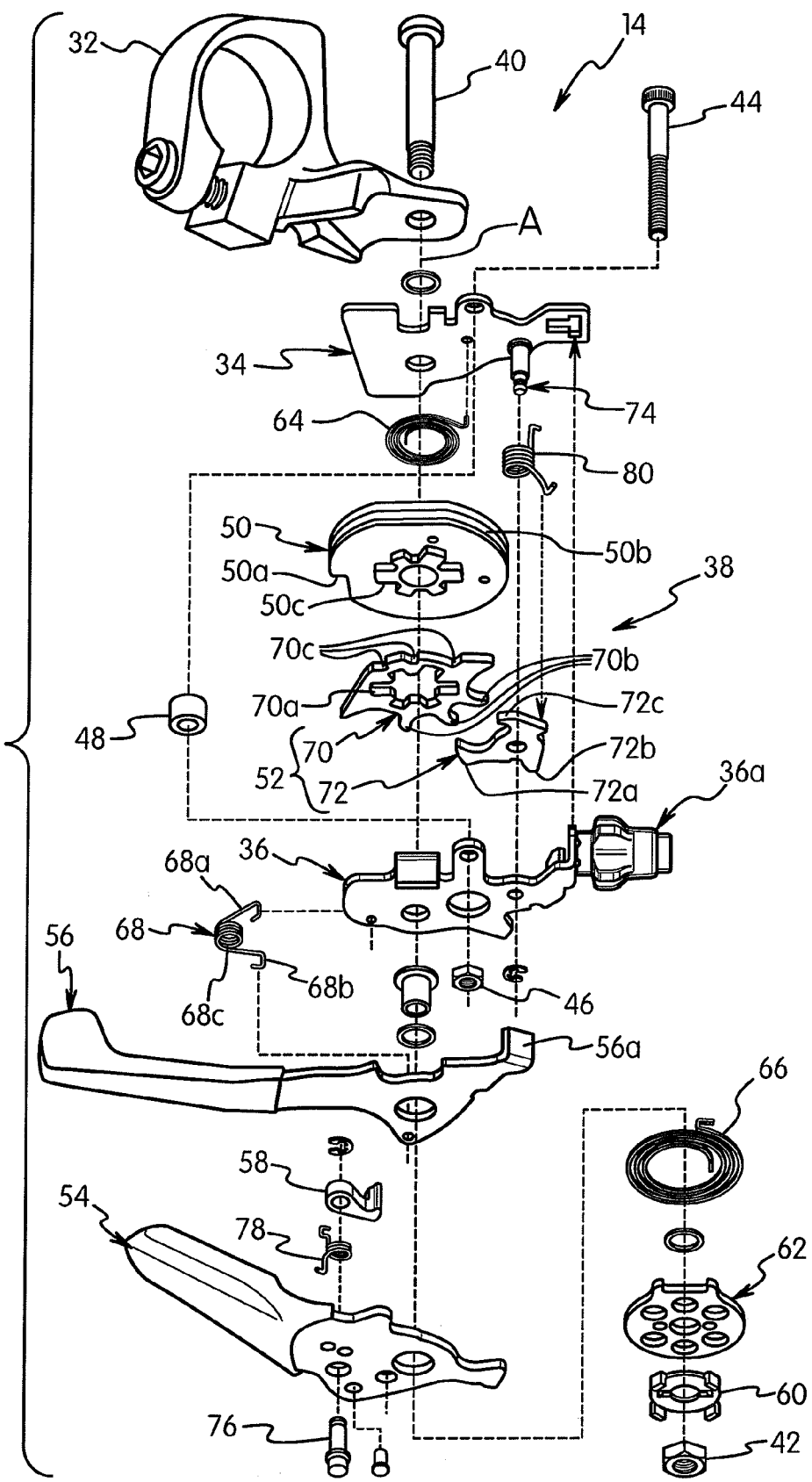
FIG. 6 is a simple exploded perspective view of selected part of the bicycle control or operating device in accordance with the illustrated embodiment.

As best seen in FIG. 6, the shift control unit 38 basically includes a wire takeup element 50, a positioning structure 52, a shift operating (winding) lever 54 and a shift operating (releasing) lever 56. The parts of the shift control unit 38 are basically supported on the support plates 34 and 36. The shift winding member 54 constitutes a first operating member of the bicycle shift operating device 14. As discussed later, the shift winding member 54 includes a winding element or pawl 58. The shift releasing lever 56 constitutes a second operating member of the bicycle shift operating device 14. In the illustrated embodiment, the wire takeup element 50 is rotatably mounted on the main support shaft 40 between the support plates 34 and 36. The shift operating levers 54 and 56 are also pivotally mounted on the main support shaft 40, but below the lower support plate 36 on the main support shaft 40.

Preferably, a nut plate 60 and a retaining plate 62 are provided on the end of the main support shaft 40 between the nut 42 and the shift winding lever 54. Thus, the shift winding lever 54 and the shift release lever 56 are disposed on the main support shaft 40 between the lower support plate 36 and retaining plate 62. The nut 42 is threaded on the lower end of the main support shaft 40 to retain the shift winding lever 54 and the shift release lever 56 on the main support shaft 40 below the lower support plate 36.

The wire takeup element 50 is rotatably mounted on the support shaft 40 to rotate with respect the housing 30 and the support plates 34 and 36 such that the wire takeup element 50 can move in both a cable pulling direction (i.e., the rotational direction R1) and a cable releasing direction (i.e., the rotational direction R2) for pulling and releasing the inner wire 22a of the front shift operating cable 22. The wire takeup element 50 includes an inner cable holding section 50a configured to engage with a cable nipple fixed to a tip end of the inner wire 22a of the front shift operating cable 22 and a cable winding groove 50b for winding in the inner wire 22a are provided on an external circumferential surface of the wire takeup element 50. Thus, the inner wire 22a of the front shift operating cable 22 is attached to the wire takeup element 50 and is wound and unwound around the external circumferential surface of the wire takeup element 50.

The wire takeup element 50 is spring loaded in the cable release direction (counterclockwise) by a spring member 64 (e.g., a torsional coil spring). One end of the spring member 64 engages with the wire takeup element 50 and the other end engages with the upper support plate 34. The wire takeup element 50 also has an engaging protrusion 50c that is configured to cause a part of the positioning structure 52 to rotate together with the wire takeup element 50. The engaging protrusion 50c is a non-circular protrusion that is formed on a lower surface of the wire takeup element 50.

The positioning structure 52 is configured to selectively position the wire takeup element 50 in any one of a plurality of (e.g., three) actuation or operating positions corresponding to a plurality of (e.g., three) shift positions of the front derailleur 16. The positioning structure 52 will be discussed below in more detail.

The shift winding lever 54 is a lever member having a cable retraction (wind-in) function for operating a typical gear changer device (e.g., the front derailleur). The shift winding lever 54 is rotatably mounted on the main support shaft 40 such that it can pivot freely between a rest or start position shown in FIG. 7 and an operation end position reached by pivoting clockwise (in FIG. 8) from the rest or start position. The shift winding lever 54 is operatively coupled to the positioning structure 52 to change a current position of the wire takeup element 50. The shift winding lever 54 is rotatable in the first rotational direction R1 and engages the positioning structure 52 to rotate the wire takeup element 50 in the first rotational direction R1. The shift winding lever 54 is preferably a trigger lever that returns to a rest position after being moved to an operating position to change the current position of the wire takeup element 50. In particular, the shift winding lever 54 is spring loaded toward the rest position by a spring member 66 (e.g., a spiral spring), which has one end engaged with the shift winding lever 54 and the other end engaged with the retaining plate 62.

The shift release lever 56 is a lever member having a release function for operating a typical gear changer device (e.g., the front derailleur). The shift release lever 56 is rotatably mounted on the main support shaft 40. The shift release lever 56 is configured to engaged the positioning structure 52 to rotate the wire takeup element 50 in a second rotational direction R2 that is opposite the first rotational direction R1. Specifically, the shift release lever 56 has a movement transmitting protrusion 56a that has been formed by bending a distal end of the shift release lever 56. The movement transmitting protrusion 56a constitutes a release member that is a part of the shift release lever 56, which is pivotally mounted on the main axis A. The movement transmitting protrusion 56a engages the positioning structure 52 to release the wire takeup element 50 for rotation in the second rotational direction R2 under the urging force of the spring member 64.

Preferably, the shift release lever 56 is a trigger lever that returns to a rest position after being moved to an operating position to change the current position of the wire takeup element 50. In particular, the shift release lever 56 is spring loaded toward the rest position by a spring member 68 (e.g., a torsional coil spring), which has a first end 68a coupled to the lower support (member) plate 36 and a second end 68b coupled to the shift release lever 56. The middle portion 68c is a coiled portion that is configured and arranged to directly contact the winding element or pawl 58 when the shift release lever 56 is moved from the neutral position (FIG. 11) to the position releasing position (FIG. 12). The middle portion 68c of the spring member 68 moves in a radial direction in response to movement of the shift release lever 56 from the neutral position to the position releasing position.

More specifically, as best seen in FIGS. 11 to 13, the spring member 68 is configured and arranged to return the shift release lever 56 to the neutral position (FIG. 13) after movement of the shift release lever 56 from the neutral position (FIG. 11) to the position releasing position (FIG. 12). As seen in FIGS. 11 to 13, the spring member 68 is also configured and arranged with respect to the lower support plate 36 to move the winding element or pawl 58 from the winding position (FIG. 11) to the disengaging position (FIG. 12) in response to movement of the shift release lever 56 from the neutral position (FIGS. 11) to the position releasing position (FIG. 12). Thus, when the shift release lever 56 returns to the neutral position (FIG. 13) under the urging force of the spring member 68, the winding element or pawl 58 is released such that the winding element or pawl 58 moves from the disengaging position to the winding position by the spring member 78.

As seen in FIG. 6, the positioning structure 52 basically includes a positioning plate or element 70 and a positioning pawl 72. Generally speaking, the positioning structure 52 is operatively coupled between the wire takeup element 50 and the lever 54 and 56 to selectively maintain the wire takeup element 50 in one of at least two positions. More specifically, the shift winding lever 54 is operatively coupled to the positioning element 70 of the positioning structure 52 by the winding element or pawl 58 such that pivotal movement of the shift winding lever 54 in the first rotational direction R1 causes the wire takeup element 50 to rotate in the first rotational direction R1 from a current shift position to a subsequent shift position with the positioning element 70 of the positioning structure 52 holding the wire takeup element 50 in the subsequent shift position. The shift release lever 56 is operatively coupled to the positioning pawl 72 of the positioning structure 52 such that movement of the shift release lever 56 in the second rotational direction R2 causes the wire takeup element 50 to rotate in the second rotational direction R2 from a current shift position to a subsequent shift position with the positioning structure 52 holding the wire takeup element 50 in the subsequent shift position.

The positioning element 70 is rotatably coupled between the upper and lower support plates 34 and 36 by the main support shaft 40 to rotate about the main axis A between a plurality of predetermined shift positions. The positioning element 70 has an engaging hole 70a that engages with the engaging protrusion 50c of the wire takeup element 50 such that the positioning element 70 moves integrally (as a unit) with the wire takeup element 50. The positioning element 70 includes an outer peripheral edge with a plurality (three) of positioning teeth 70b selectively engagable with the positioning pawl 72 (i.e., position maintaining member) and a plurality (three) of winding teeth 70c selectively engagable with the winding element or pawl 58.

The positioning pawl 72 is pivotally mounted between the upper and lower support plates 34 and 36 by a pivot shaft 74. The positioning pawl 72 constitutes a position maintaining member that is movably arranged with respect to the upper and lower support plates 34 and 36 to move between a holding position (FIG. 7) that holds the positioning element 70 in one of the predetermined shift positions and a position releasing position (FIG. 10) that releases the positioning element 70 for rotational movement to move one gear or shift position. The positioning pawl 72 has a stop tooth 72a, an actuating projection 72b and an over rotation preventing tooth 72c. The positioning pawl 72 is configured to move in a plane parallel to the positioning element 70 to selectively move the stop tooth 72a between an engaging position in which one of them engages with one of the positioning teeth 70b and a position releasing position in which it does not engage one of the positioning teeth 70b. The over rotation preventing tooth 72c is configured to move between a contact position where it engages one of the positioning teeth 70b at a different position than the stop tooth 72a and a disengaged position where it does not engage one of the positioning teeth 70b.

As mentioned above, the shift winding lever 54 is provided with the winding pawl 58. In particular, the winding pawl 58 is pivotally mounted on a pivot pin 76 that is fixed to the shift winding lever 54. Thus, the winding element or pawl 58 is movably arranged with respect to the lower support (member) plate 36 and the shift winding lever 54 to move between the winding position and the disengaging position. A spring member 78 (e.g., a torsional coil spring) is provided on the pivot pin 76 with one end of the spring member 78 engaged with the shift winding lever 54 and the other end of the spring member 78 engaged with the winding pawl 58. The spring member 78 biases the winding pawl 58 towards the positioning element 70. The winding pawl 58 is configured to move between the winding position where it engages one of the winding teeth 70c and the disengaging position where it separates from one of the winding teeth 70c. The number of positioning teeth 70b and the number of the winding teeth 70c corresponds to the number of shift positions of the front derailleur 16 and the teeth 70b and 70c are configured to protrude radially outward from an external circumferential surface of the positioning element 70. Together with the wire takeup element 50, the positioning element 70 is spring loaded in the cable release direction (counterclockwise) by the spring member 64. The size of the spaces between the positioning teeth 70b and the winding teeth 70c is determined based on the amount of cable movement required to achieve the shift positions of the front derailleur 16.

As mentioned above, the positioning pawl 72 is attached in a freely pivotal manner to the pivot shaft 74. The pivot shaft 74 is arranged to protrude from the bottom surface of the upper support plate 34. The positioning pawl 72 is spring loaded by a spring member 80 (e.g., a torsional coil spring) in the clockwise direction of FIGS. 7 to 10 such that the stop tooth 72a of the positioning pawl 72 is arranged in the holding position. The actuating projection 72b configured to protrude radially outward is provided on an external circumferential surface of the positioning pawl 72. The movement transmitting protrusion 56a is arranged to engage a distal end portion of the actuating projection 72b to rotate the positioning pawl 72 when the shift release lever 56 is pivoted to the position releasing position. In other words, the movement transmitting protrusion 56a of the shift release lever 56 is pivotally arranged with respect to the lower support plate 36 to move the positioning pawl 72 (i.e., the position maintaining member) between the holding position and the position releasing position in response to pivotal movement of the movement transmitting protrusion 56a of the shift release lever 56 between a neutral position and a position releasing position. Thus, the movement transmitting protrusion 56a acts as a release member for the positioning structure 52. Although the movement transmitting protrusion 56a (release member) is integrally formed with the shift release lever 56 in the illustrated embodiment, the movement transmitting protrusion 56a (release member) can be a separate member from the shift release lever 56, if desired.

Figure 8:
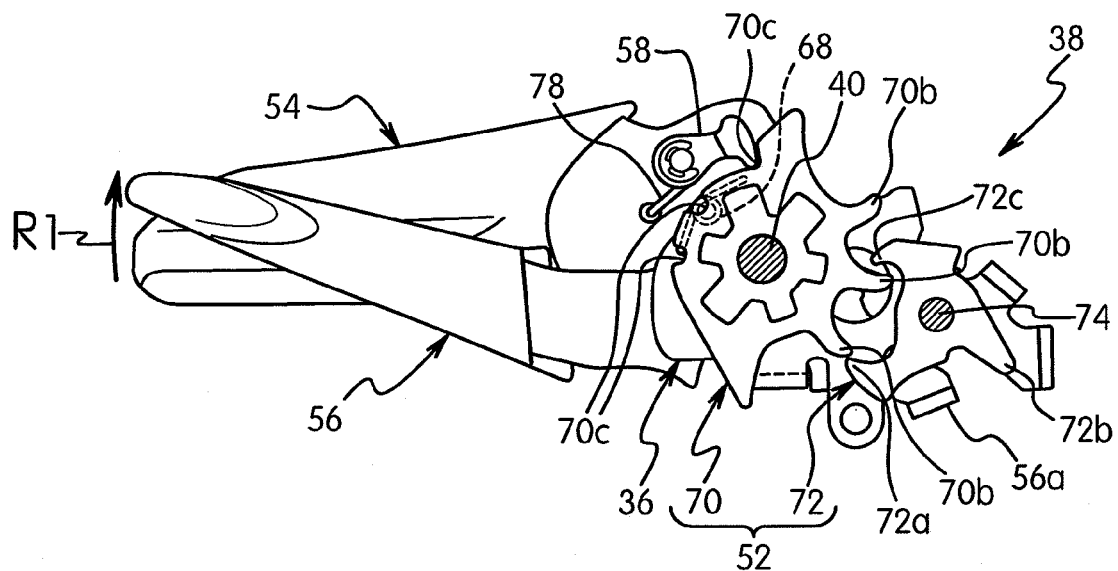
FIG. 8 is an enlarged top plan view, similar to FIG. 7, of selected parts of the gear shifter component illustrating the winding lever in an intermediate position during a shifting operation in a first or winding direction.
Figure 9:
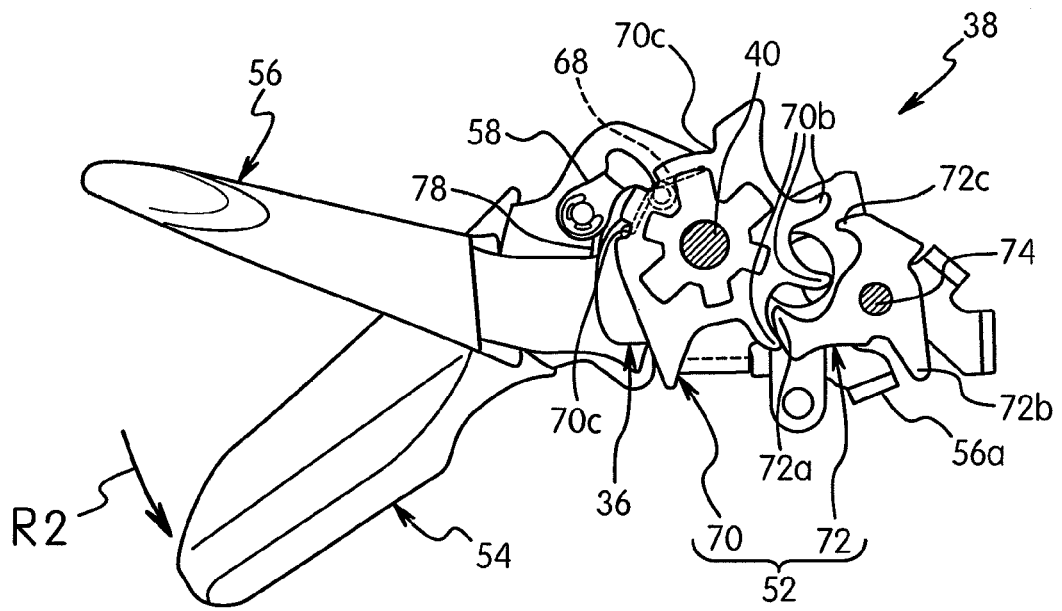
FIG. 9 is an enlarged top plan view, similar to FIGS. 7 and 8, of selected parts of the gear shifter component illustrating the winding lever being returned to the end from the shifting operation of FIG. 8.
Figure 10:
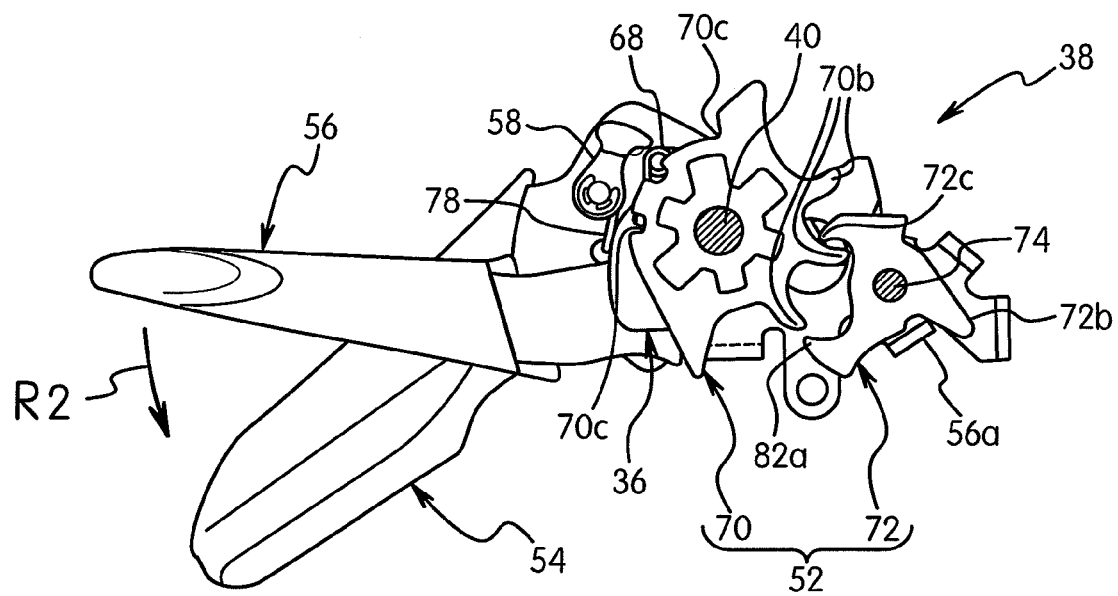
FIG. 10 is an enlarged top plan view, similar to FIGS. 7 to 9, of selected parts of the gear shifter component illustrating the release lever in an position releasing position during a shifting operation in the second or release direction.

As seen in FIG. 9, the stop tooth 72a of the positioning pawl 72 is configured to contact the positioning teeth 70b so as to stop rotation of the positioning element 70 (which is spring loaded in the counterclockwise direction of FIGS. 7 to 10) in the cable release direction. As seen in FIG. 10, when the over rotation preventing tooth 72c moves to the contact position by the movement transmitting protrusion 56a, the over rotation preventing tooth 72c contacts one of the positioning teeth 70b located one tooth downstream in the release direction from one of the positioning teeth 70b that the positioning pawl 72 was contacting, thereby preventing the positioning element 70 from continuing to rotate in the cable release direction after the positioning pawl separates from one of the positioning teeth 70b. When the over rotation preventing tooth 72c is in the contact position, the stop tooth 72a of the positioning pawl 72 is arranged in a position located beyond one of the positioning teeth 70b that it was originally engaged with.

Figure 7:
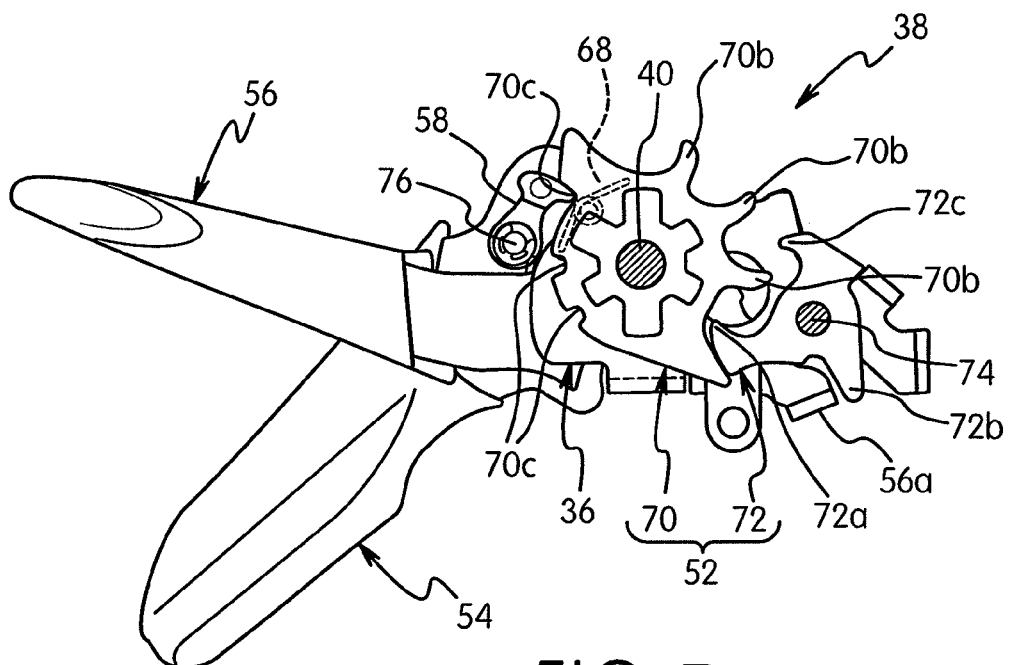
FIG. 7 is an enlarged top plan view of selected parts of the gear shifter component shown in a neutral or rest position.

As shown in FIG. 7, the winding pawl 58 is pivotally mounted on the pivot pin 76 arranged protruding from the shift winding lever 54. The winding pawl 58 is spring loaded in the clockwise direction in FIGS. 7 to 10 by the spring member 78 (e.g., a torsional coil spring) such that the winding pawl 58 is normally arranged in the winding position. When the shift winding lever 54 is in an operation start or rest position, the winding pawl 58 engages one of the winding teeth 70c. Consequently, the winding pawl 58 is normally arranged in the winding position when the shift winding lever 54 is in the start or rest position unless the shift release lever 56 is operated. When the shift release lever 56 is operated from the start or rest position toward an operation end position (i.e., the position releasing position), the distal end of the winding pawl 58 moves out of engagement with the winding teeth 70c.

Basically, the lower support (member) plate 36, the positioning element 70, the positioning pawl 72 (i.e., the position maintaining member), the winding element or pawl 58, the movement transmitting protrusion 56a (i.e., the release member) and the spring member 66 form a bicycle component positioning device for controlling the movement of the wire takeup element 50.

The operation of the shift control unit 38 of bicycle shift operating device 14 in order to shift gears will now be explained with reference to FIGS. 7 to 10. First, an operation of pulling the front shift operating cable 22 will be explained.

As shown in FIGS. 7 and 9, the neutral state is shown in which neither the shift winding lever 54 nor the shift release lever 56 has been operated. In FIG. 7, the front derailleur 16 is in a first (low) position, i.e., the position corresponding to the sprocket having the smallest tooth count, and the wire takeup element 50 is in the first actuation position. If, from the state shown in FIG. 7, a rider presses the shift winding lever 54 with a left thumb and moves th8 7, from the start position toward the end position, then the winding pawl 58 will contact one of the winding teeth 70c of the positioning element 70 and the positioning element 70 and the wire takeup element 50 will be pivoted in the cable retracting (wind-in) direction, i.e., the clockwise direction of FIG. 7. This pivot movement causes the inner wire 22a to be pulled such that the front derailleur 16 moves toward an intermediate position corresponding to the middle sprocket, i.e., the sprocket having an intermediate diameter. During this movement, as shown in FIG. 8, the positioning pawl 72 is moved by the middle one of the positioning teeth 70b engaging the stop tooth 72a to rotate the positioning pawl 72 such that the positioning pawl 72 pivots in the counterclockwise direction. When the shift winding lever 54 has been pivoted to the end position and released, the shift winding lever 54 returns to the start position as shown in FIG. 9 due to the spring load of the spring member 66 and the positioning element 70 is positioned due to the engagement of the positioning pawl 72 with the positioning teeth 70b. In the rest or neutral position, the winding pawl 58 is arranged in the winding position where it is engaged with one the winding teeth 70c.

Now an operation of releasing the front shift operating cable 22 will be explained with reference to FIGS. 7, 9 and 11 to 13. If, from the state shown in FIGS. 9 and 11, the shift release lever 56 is moved counterclockwise, i.e., in the second rotational direction R2, then the middle portion 68c of the spring member 68 is moved in a radial direction in response to movement of the shift release lever 56 from the neutral position to the position releasing position (FIG. 12). In other words, as seen in FIGS. 11 and 12, during the releasing operation, the middle portion 68c of the spring member 68 moves outwardly in a radial direction with respect to the main support shaft 40 that defines the main pivot axis the releasing operation. This movement of the shift release lever 56 from the neutral position (FIG. 11) to the position releasing position (FIG. 12) results in the middle portion 68c of the spring member 68 contacting the winding element or pawl 58 such that the winding element or pawl 58 is moved from the winding position (FIG. 11) to the disengaging position (FIG. 12). This movement of the shift release lever 56 also causes the movement transmitting protrusion 56a of the shift release lever 56 to contact the actuating projection 72b to rotate the positioning pawl 72 in a counterclockwise direction. As a result, the over rotation preventing tooth 72c is moved in between two of the positioning teeth 70b to prevent the positioning element 70 from rotating to far under the force of the spring member 64. Thus, when the positioning pawl 72 pivots counterclockwise, the positioning pawl 72 separates from one of the positioning teeth 70b and the positioning element 70 rotates counterclockwise together with the wire takeup element 50 in the cable release direction.

When the positioning element 70 rotates in the cable release direction, the over rotation preventing tooth 72c of the positioning pawl 72 contacts one of the positioning teeth 70b located one tooth away from one of the positioning teeth 70b and the positioning element 70 stops rotating. When the rider releases the shift release lever 56, the shift release lever 56 returns to the neutral position as shown in FIGS. 7 and 10 due to the spring force of the spring member 68. The positioning pawl 72 then rotates clockwise due to the spring member 80 and the over rotation preventing tooth 72c separates from one of the positioning teeth 70b, causing the positioning element 70 to rotate counterclockwise again. However, the positioning pawl 72 contacts the positioning teeth 70b and causes the positioning element 70 and the wire takeup element 50 to be positioned (i.e., held in a position corresponding to the low gear). Moreover, when the spring member 68 moves back to its original position, the winding element or pawl 58 is released such that the winding pawl 58 moves from the dis-engaging position to the winding position by the spring member 78. As a result, the inner wire 22a of the shift operating cable 22 is released by such an amount that the front derailleur 16 moves to the low position. Throughout the releasing operation, the shift winding lever 54 remains stationary, as shown in FIGS. 11 to 13.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component positioning device comprising:
   a support member;
   a positioning element rotatably coupled to the support member to rotate about a main axis between a plurality of predetermined shift positions;
   a position maintaining member movably arranged with respect to the support member to move between a holding position that holds the positioning element in one of the predetermined shift positions and a position releasing position that releases the positioning element for rotational movement;
   a winding element movably arranged with respect to the support member to move between a winding position and a disengaging position;
   a release member pivotally arranged with respect to the support member to move the position maintaining member between the holding position and the position releasing position in response to pivotal movement of the release member between a neutral position and a position releasing position; and a spring member arranged with respect to the support member to move the winding element from the winding position to the disengaging position in response to movement of the release member from the neutral position to the position releasing position and to return the release member to the neutral position after movement of the release member from the neutral position to the position releasing position, with the spring member applying a biasing force to the release member without the biasing force being transmitted through the position maintaining member.

2. The bicycle component positioning device according to claim 1, wherein
the spring member has a first end coupled to the support member, a second end coupled to the release member and a middle portion arranged to directly contact the winding element when the release member is moved from the neutral position to the position releasing position.

3. The bicycle component positioning device according to claim 2, wherein
the middle portion of the spring member moves in a radial direction in response to movement of the release member from the neutral position to the position releasing position.

4. A bicycle component positioning device according to claim 2, wherein
the middle portion of the spring member is a coiled portion.

5. The bicycle component positioning device according to claim 4, wherein
the coiled portion of the spring member moves outwardly in a radial direction with respect to main axis in response to movement of the release member from the neutral position to the position releasing position.

6. A bicycle component positioning device according to claim 1, wherein
the winding element is a winding pawl that is pivotally mounted on a winding lever.

7. A bicycle component positioning device according to claim 1, wherein
the release member is a part of a release lever that is pivotally mounted on the main axis.

8. A bicycle component positioning device according to claim 7, wherein
the winding element is a winding pawl that is pivotally mounted on a winding lever, with the winding lever being pivotally mounted on the main axis.

9. The bicycle component positioning device according to claim 8, wherein
the positioning element includes an outer peripheral edge with a plurality of positioning teeth selectively engagable with the position maintaining member and a plurality of winding teeth selectively engagable with the winding pawl.

10. The bicycle component positioning device according to claim 1, wherein
the winding element is a winding pawl that is pivotally mounted on a winding lever, with the winding lever remaining stationary throughout a release operation by the release member.

11. The bicycle component positioning device according to claim 1, wherein
the winding element is a winding pawl that is pivotally mounted on a winding lever, and
the main axis is a coaxial pivot axis on which the winding lever and the release member pivot independently.

\* \* \* \* \*